United States Patent Office 3,448,104
Patented June 3, 1969

3,448,104
BETAINE PENICILLIN DERIVATIVES
Kenneth David Hardy, Horsham, John Herbert Charles Nayler, Dorking, and Edward Raymond Stove, Redhill, England, assignors to Beecham Group Limited, Brentford, England, a British company
No Drawing. Filed May 18, 1966, Ser. No. 550,913
Claims priority, application Great Britain, May 29, 1965, 22,955/65
Int. Cl. C07d 99/20, 99/16; A61k 21/00
U.S. Cl. 260—239.1                                         7 Claims

ABSTRACT OF THE DISCLOSURE

New betaine penicillins are provided which contain a quaternary ammonium group derived from a tertiary amine such as trialkylamines or their heterocyclic tertiary amines, the new penicillins being derivatives of 6-aminopenicillanic acid and having use as anti-bacterial agents. Representative compounds are α-trimethylaminobenzylpencillin betaine and α-(pyridinacetamindo)benzylpenicillin betaine.

---

This invention relates to new penicillins and is particularly concerned with a new class of penicillins which are derivatives of 6-aminopenicillanic acid and which are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

According to the present invention there are provided new betaine penicillins of the general formula:

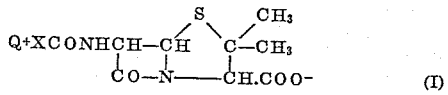
(I)

where Q⁺ is a quaternary ammonium group derived from a t-amine Q, and X is a divalent organic radical.

Examples of suitable t-amines Q include trialkylamines, and heteroaromatic bases and reduced heterocyclic systems.

The invention also provides a process for preparing the betaine penicillins of Formula I, which process comprises quaternising with a t-amine Q, a penicillin, or nontoxic salt thereof, of the general formula:

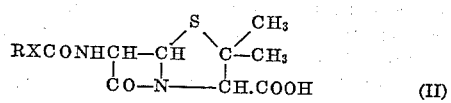
(II)

where R is the acid residue of a reactive ester, such as a halogen atom or a sulphuric acid residue, e.g. methoxysulphonyloxy, or a sulphonic acid residue, e.g. methanesulphonyloxy or toluene-p-sulphonyloxy.

Preferably the quaternisation is effected at 0 to 50° in an inert solvent, which may be aqueous, partly aqueous or anhydrous. In some instances, the t-amine Q can be used in excess to act as solvent. The reaction may be effected in the presence or absence of an acid binder, which may be the t-amine Q itself. The products are recovered from the solutions by the usual methods, including precipitation, solvent extraction and vacuum evaporation. The progress of the quaternisation may be followed by paper chromatography.

The starting penicillins (II) are prepared by known methods, including fermentation of a penicillin-producing mould in presence of a side-chain precursor RXCOOH or a derivative of the acid (X consisting of or containing a $CH_2$ group adjacent to the COOH group), and more generally by acylation of 6-aminopenicillanic acid with a reactive functional derivative of RXCOOH (when X is any divalent organic group). Alternatively, penicillins produced by these methods may be chemically modified to introduce group R.

The following examples illustrate the invention:

EXAMPLE 1

6-aminopenicillanic acid (10.8 g.) was stirred in water (100 ml.) and adjusted to pH 7.5 with N sodium hydroxide (50 ml.). To the resulting solution was added a solution of α-bromophenylacetyl chloride (11.68 g.) in absolute ether (150 ml.), and the mixture was stirred vigorously for 1½ hours at room temperature. The ether layer was separated, dried by shaking with saturated brine (75 ml.) and combined with a second ether (150 ml.) extract of the acid layer (pH 2) and the brine. A 1.67 N solution of sodium 2-ethylhexoate in methyl isobutyl ketone (30 ml.) was added to the combined ether extracts, and the sodium salt of α-bromobenzylpenicillin separated as a syrup. The mixture was diluted with absolute ether (250 ml.), and the syrup started to crystallize after about ¼ hour. After 1 hour the ether was decanted and the solid washed by decantation with fresh ether (100 ml.). The solid was digested in further absolute ether (200 ml.) for 1 hour and then collected by filtration, washed on the filter with ether, and dried in vacuo without a desiccant. The sodium salt of α-bromobenzylpenicillin (19.3 g.) was obtained as a pale yellow coloured solid, which was estimated to be 88% pure by colorimetric assay with hydroxylamine.

EXAMPLE 2

Sodium α-bromobenzylpenicillin (2.2 g.) was dissolved in water (20 ml.) and the free acid acidified (pH 1.5–2) into ether (20+10 ml.) with N hydrochloric acid (5 ml.). The ether extracts were washed with saturated brine and then evaporated to dryness at low temperature and pressure. The residual α-bromobenzylpenicillin free acid was dissolved in ethyl acetate (10 ml.) and treated with a N solution of trimethylamine in ethyl acetate (15 ml.). The resulting solution was allowed to stand for 20 hours at room temperature and then the solvent was decanted from the syrup that had separated. The syrup was digested in fresh ethyl acetate and the ethyl acetate removed by decantation to give the crude product. It was shaken in a mixture of water (20 ml.) and ethyl acetate (20 ml.), and the pH of the aqueous layer was adjusted to pH 2.5 with a few drops of N hydrochloric acid. The ethyl acetate layer was discarded and the aqueous layer was washed with fresh ethyl acetate (10 ml.). The aqueous layer was adjusted to pH 7 with N sodium bicarbonate (10 drops) and then evaporated to dryness at low temperature and pressure to give α-trimethylaminobenzylpenicillin betaine as a white powder. It was estimated to be 60% pure by colorimetric assay with hydroxylamine.

EXAMPLE 3

Sodium α-bromobenzylpenicillin (1.1 g.) was dissolved in water (5 ml.) and the free acid was acidified (pH 1.2–2) into ether (10 ml.) with N hydrochloric acid (2.5 ml.). The ether extract was washed by shaking with saturated brine (5 ml.) and evaporated to dryness at low temperature and pressure. The residual α-bromobenzylpenicillin free acid was dissolved in dry pyridine (5 ml.) and the solution allowed to stand for 6 hours at room temperature. Ether (50 ml.) was added to the solution and the mixture of oil and solid that separated was collected by filtration. The residue in the filter was digested in n-butyl acetate (2× 12 ml.) when it changed to a yellow powder. It was further digested in ethyl acetate (10 ml.), and then dissolved in a mixture of water (10 ml.) and ethyl acetate (10 ml.). N hydrochloric acid (2 drops) was added, but nothing was precipitated and the pH remained at 2.5. The aqueous layer was separated, washed with fresh ethyl acetate (10 ml.) and adjusted to pH 4 with N sodium bicarbonate (20 drops). It was evaporated to dryness at low temperature and pressure to give α-pyridinobenzylpenicillin betaine as a pale yellow powder (0.37 g.), which was estimated to be 57% pure by colorimetric assay with hydroxylamine.

EXAMPLE 4

[D(—)-α-amino α-phenylacetamido]penicillanic acid (3.49 g.; 0.01 mol.) suspended in water (20 ml.) was cooled to 5° C., N sodium hydroxide (10 ml.) was added to dissolve the solid and the solution was treated, at 5° C. with a solution of chloroacetyl chloride (0.76 ml.; 0.01 mol.) in methyl isobutyl ketone (30 ml.). The resulting mixture was stirred for 1 hr. without further cooling. The two phase mixture was filtered through "Celite" (registered trademark) to clarify it, and the layers were separated. The methyl isobutyl ketone solution was washed with saturated brine (10 ml.), and again filtered through "Celite." The clear filtrate was treated with 1.67 N solution of sodium 2-ethylhexoate in methyl isobutyl ketone (6 ml.). The mother liquors were decanted from the product and the residual gum was triturated with dry ether until solid. The resulting solid was filtered off, washed with dry ether and dried over phosphorus pentoxide in a vacuum desiccator to give 3.25 g. of sodium α-(chloroacetamido)benzylpenicillin with an estimated purity of 83.4% by colorimetric assay with hydroxylamine.

EXAMPLE 5

Sodium α-(chloroacetamido)benzylpenicillin (2.24 g.; 0.005 mol.) dissolved in water (15 ml.) was covered with ethyl acetate (15 ml.) and adjusted to pH 2, with stirring, by addition of N-hydrochloric acid. The ethyl actate layer was separated and the aqueous layer extracted with further ethyl acetate (2×10 ml.). The combined organic layers were washed with N-hydrochloric acid (5 ml.), followed by water (2× 5 ml.), and dried over anhydrous magnesium sulphate. The dried solution was evaporated under reduced temperature and pressure and the residual oil was dissolved in dry acetone (15 ml.). The resulting soltuion was treated with a 10% v./v. solution of trimethylamine in dry acetone (15 ml.). Solid began to separate after 30 mins. and after standing 24 hours the solid product was filtered off, washed well with dry acetone and dried over phosphorus pentoxide in a vacuum desiccator to give 1.62 g. (73.3%) of α-(trimethylaminoacetamido)-benzylpenicillin betaine with an estimated purity of 83.4% by colorimetric assay with hydroxylamine.

EXAMPLE 6

[D(—)-α-amino α-phenylacetamido]penicillanic acid (34.9 g.; 0.1 mol.) suspended in water (500 ml.) was treated with N sodium hydroxide (100 ml.), N sodium bicarbonate (150 ml.) and acetone (250 ml.). The resulting solution was cooled to 12° C., treated with a solution of bromoacetyl bromide (8.7 ml.; 0.1 mol.) in dry acetone (500 ml.) all at once, and stirred at room temperature for 2 hours. The reaction mixture was filtered through "Celite," extracted with ether (3× 300 ml.) and the ether extracts were discarded. The aqueous layer was covered with ether (200 ml.) and adjusted to pH 2 with 5 N hydrochloric acid. The ether layer was separated and the aqueous layer extracted with further ether (3× 250 ml.). The combined ether extracts were washed with water (2× 50 ml.) and extracted with N sodium bicarbonate solution to pH 6.5. The combined aqueous extracts were evaporated under reduced temperature and pressure and the residue dried over phosphorus pentoxide in a vacuum desiccator to give 30 g. (61%), sodium α-(bromoacetamido)benzylpenicillin with an estimated purity of 72.9% by colorimetric assay with hydroxylamine.

EXAMPLE 7

Sodium α-(bromoacetamido)benzylpenicillin (4.92 g.; 0.01 mol.) dissolved in water (30 ml.) and covered with ethyl acetate (30 ml.) was adjusted to pH 2 with N hydrochloric acid. The ethyl acetate layer was separated and the aqueous layer extracted with further ethyl acetate (2× 20 ml.). The combined ethyl acetate extracts were washed with N hydrochloric acid (10 ml.), followed by water (2× 10 ml.) and dried over anhydrous magnesium sulphate. The dry solution was evaporated under reduced temperature and pressure and the residual oil was dissolved in dry acetone (30 ml.). The resulting solution was treated with dry pyridine (2.4 ml.; 0.03 mol.) and set aside at room temperature. Solid began to separate after 45 minutes, and after 24 hours the solid was filtered off, washed well with dry acetone, and dried over phosphorus pentoxide in a vacuum desiccator to give 4.35 g. (93%) of α-(pyridinoacetamido)benzylpencillin betaine with an estimated purity 63.9% by colorimetric assay with hydroxylamine.

EXAMPLE 8 p-Aminobenzylpenicillin (0.5 g.) was dissolved in a mixture of 3% aqueous sodium bicarbonate (12 ml.) and acetone (8 ml.). The solution was cooled to 0° C. and a solution of bromoacetyl chloride (0.15 ml.) in acetone (3 ml.) was added with stirring during 5 minutes. The mixture was stirred at 0° C. for 1 hour, then concentrated under reduced pressure to remove acetone. The aqueous concentrate was washed with ether and the extracts were discarded. The aqueous layer was again cooled to 0° C., covered with n-butyl actate (25 ml.) and stirred while dilute hydrochloric acid was added to pH 2. The layers were separated and the aqueous phase was extracted with bore butyl acetate (15 ml.).

The combined butyl acetate solutions, which contained p-(bromoacetamido)benzylpenicillin, were washed with a little water and then dried over anhydrous sodium sulphate. The mixture was filtered and to the filtrate was added a solution of trimethylamine in n-butyl acetate (1 ml. of 20% w./v.). The solution quickly became turbid due to separation of the betaine, and the mixture was set aside in the refrigerator. Next morning, the supernatant liquid was decanted and the residual gum was dissolved in water, neutralised by adding a few drops of N hydrochloric acid, and washed twice with ether. Evaporation of the neutral aqueous solution left p-(trimethylaminoacetamido)benzylpenicillin betaine as a gum (0.44 g., after drying in a vacuum desiccator). A specimen was obtained in solid form by dissolution in dry chloroform followed by precipitation with dry ether, but it was too deliquescent to be readily separable by filtration.

Paper chromatography of the product revealed a new zone of antibacterial activity with $R_F$ different from those of p-aminobenzylpenicillin and its N-bromoacetyl derivative.

EXAMPLE 9 p - (N - methylmorpholinoacetamido)benzylpenicillin betaine was prepared by the procedure of Example 8, except that n-butanol was used instead of n-butyl acetate and N-methylmorpholine (0.15 ml.) instead of trimethylamine. The penicillin betaine was obtained as a very deliquescent solid (0.45 g.) having a distinctive $R_F$ value on paper chromatography.

EXAMPLE 10

Sodium chloromethyl penicillin (3.77 g.; 0.012 mol.) was dissolved in water (15 ml.), covered with ether (15 ml.) and acidified to pH 2 with N hydrochloric acid. The ether layer was separated and the aqueous layer extracted with ether (2× 10 ml.). The combined ether layers were washed with water (2× 5 ml.), dried over anhydrous magnesium sulphate and evaporated to dryness under reduced temperature and pressure. The residue was dissolved in dry acetone (15 ml.), treated with a 10% v./v. solution of trimethylamine in acetone (25.6 ml.) and set aside at room temperature. The solution turned yellow and an oil began to separate. After 24 hours the supernatant liquid was decanted and the residual yellow gum triturated with dry acetone to give a yellow solid. The product, trimethylammonium methyl penicillin betaine, was filtered off, washed with acetone and dried over phosphorus pentoxide in vacuo to give 3.5 g. (92.6%) with an estimated purity of 36.5% determined by colorimetric assay with hydroxylamine.

EXAMPLE 11

Sodium chloromethyl penicillin (1.88 g.; 0.006 mol.) was dissolved in water (10 ml.), covered with ether (10 ml.), and adjusted to pH 2 with N hydrochloric acid. The ether layer was separated and the aqueous layer extracted with ether (2× 10 ml.). The combined ether layers were washed with water (2× 5 ml.), dried over anhydrous magnesium sulphate and evaporated to dryness under reduced temperature and pressure. The residue was dissolved in dry acetone (10 ml.) treated with pyridine (1.44 ml.) and stood at room temperature for 48 hours. The mother liquor was decanted and the residual gum triturated with dry acetone to give a yellow solid. The product, pyridinium methyl penicillin betaine, was filtered off, washed with acetone and dried over phosphorus pentoxide in vacuo to give 0.47 g. (23.4%) with an estimated purity 42% determined by colorimetric assay with hydroxylamine.

EXAMPLE 12

Sodium α - (3 - bromopropionamido)benzylpenicillin (2.85 g.; 0.0056 mol.), was dissolved in water (20 ml.), covered with ethyl acetate (20 ml.) and adjusted to pH 2 with N hydrochloric acid. The ethyl acetate solution was separated and the aqueous phase extracted with ethyl acetate (2× 15 ml.). The combined ethyl acetate solution was washed with water (2× 10 ml.) dried over anhydrous magnesium sulphate and evaporated to dryness under reduced temperature and pressure. The residue was dissolved in dry acetone (15 ml.) treated with a solution of 10% v./v. trimethylamine in acetone (12 ml.) and stood at room temperature for 24 hours. The mother liquor was decanted and the residual gum triturated with dry acetone to give α-(3-trimethylammonium propionamido)benzylpenicillin betaine as a white solid. The product was filtered off, washed with acetone and dried over phosphorus pentoxide in vacuo to give 1.87 g. (71.9%) with an estimated purity of 76.9% determined by colorimetric assay with hydroxylamine.

The starting halogeno penicillin used in this and the following example was prepared by treating D-α-aminobenzylpenicillin with β-bromopropionylchloride.

EXAMPLE 13

Sodium α - (3 - bromopropionamido)benzylpenicillin (1.67 g.; 0.0033 mol.) was dissolved in water (10 ml.), covered with ethyl acetate (10 ml.) and adjusted to pH 2 with N hydrochloric acid. The ethyl acetate layer was separated and the aqueous layer extracted with ethyl acetate (2× 10 ml.). The combined organic layers were washed with water (2× 5 ml.) dried over anhydrous magnesium sulphate and evaporated to dryness under reduced temperature and pressure. The residue was dissolved in dry acetone (10 ml.) treated with pyridine (0.8 ml.) and stood at room temperature for 72 hours. The solid product was filtered off, washed with acetone and dried over phosphorus pentoxide in vacuo to give 0.42 g. (26.4%) of α-(3-pyridinium propionamido) benzylpenicillin betaine as yellow solid with an estimated purity 43.1% determined by colorimetric assay with hydroxylamine.

EXAMPLE 14

Sodium 2-bromoethylpenicillin (2.45 g.; 0.0066 mol.) was dissolved in water (20 ml.), covered with ethyl acetate (20 ml.) and adjusted to pH 2 with N hydrochloric acid. The ethyl acetate solution was separated and the aqueous layer extracted with ethyl acetate (2× 10 ml.). The combined ethyl acetate layers were washed with water (2× 5 ml.), dried over anhydrous magnesium sulphate and evaporated to dryness under reduced temperature and pressure. The residue was dissolved in dry acetone (10 ml.), treated with pyridine (1.6 ml.) and stood at room temperature for 6 days. The mother liquor was decanted and the residual oil triturated with dry acetone to give 2-pyridinium ethyl penicillin betaine as a yellow solid. The product was filtered off, washed with acetone and dried over phosphorus pentoxide in vacuo to give 1.27 g. (55.1%) with an estimated purity 30% determined by colorimetric assay with hydroxylamine.

EXAMPLE 15

Sodium 2-bromoethyl penicillin (2.46 g.; 0.0066 mol.) was converted to a free acid as in the previous example. The isolated free acid was dissolved in dry acetone (15 ml.), treated with 10% v./v. trimethylamine in acetone (13.32 ml.) and stood at room temperature. Crystals began to separate almost immediately. After 5 hours the solid was filtered off, washed with acetone and dried over phosphorus pentoxide in vacuo to give 1.1 g. colourless crystalline solid. Chromatographic and infrared spectra evidence indicated that this material was the amine salt of the starting penicillin. The crystalline solid (1 g.) was dissolved in dry dimethylformamide (20 ml.), treated with 10% v./v. trimethylamine in acetone (2.5 ml.) and stood at room temperature for 48 hours. The yellow solution was diluted with dry ether (100 ml.). The precipitated solid was filtered off, washed with acetone and dried over phosphorus pentoxide in vacuo to give 0.58 g. (26.7%) of 2-trimethylammonium ethyl penicillin betaine with an estimated purity of 32.7% determined by colorimetric assay with hydroxylamine.

We claim:
1. α-Trimethylaminobenzylpenicillin betaine.
2. α-Pyridinobenzylpenicillin betaine.
3. α-(Trimethylaminoacetamido)benzylpenicillin betaine.
4. α-(Pyridinoacetamido)benzylpenicillin betaine.
5. Pyridinium methyl penicillin betaine.
6. α-(3-trimethylammonium propionamido)benzylpenicillin betaine.
7. 2-trimethylammonium ethyl penicillin betaine.

No references cited.

NICHOLAS S. RIZZO, *Primary Examiner.*

U.S. Cl. X.R.

260—999